March 14, 1939.    P. SCHWERIN ET AL    2,150,346
ELECTRON DISCHARGE SYSTEM
Filed Oct. 3, 1935    3 Sheets-Sheet 1

*Inventors*
*P. Schwerin:*
*H. C. Atkins:*
by
*W. E. Evans:*
*Attorney.*

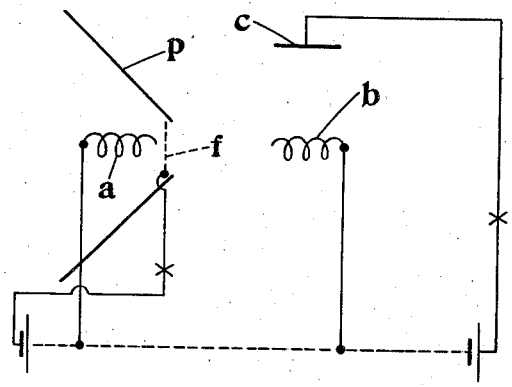
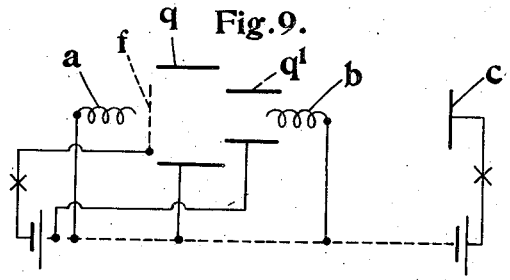
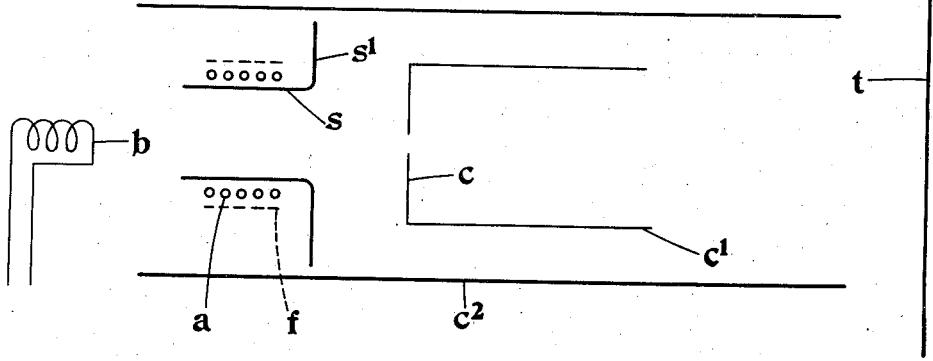

March 14, 1939.  P. SCHWERIN ET AL  2,150,346
ELECTRON DISCHARGE SYSTEM
Filed Oct. 3, 1935  3 Sheets-Sheet 3
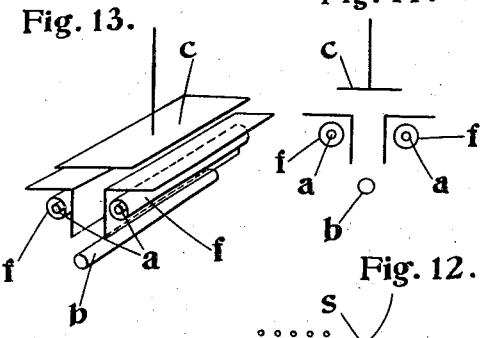
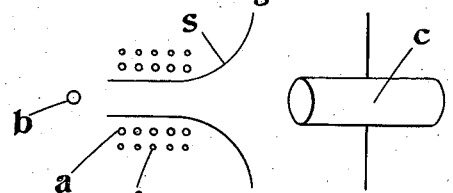
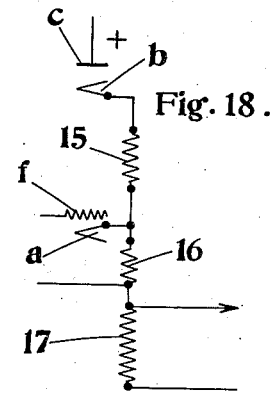
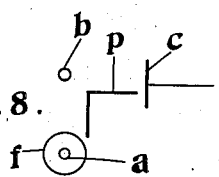
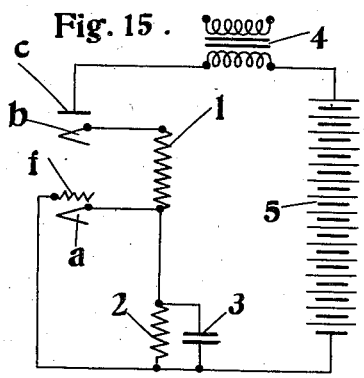
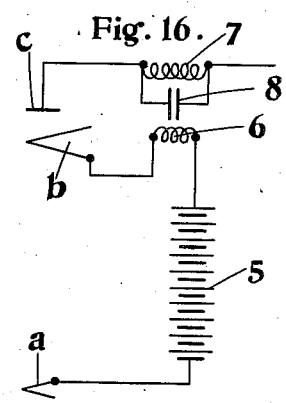
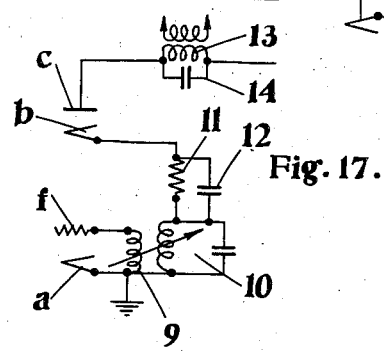
Inventors
P. Schwerin;
K. C. Atkins:
by
W. E. Evans
Attorney.

Patented Mar. 14, 1939

2,150,346

UNITED STATES PATENT OFFICE

2,150,346

ELECTRON DISCHARGE SYSTEM

Paul Schwerin, Rutherford, N. J., and Hubert Cyril Atkins, Acton, London, England, assignors to Electronic Devices Limited, London, England Application October 3, 1935, Serial No. 43,363
In Great Britain January 14, 1935

32 Claims. (Cl. 250—27)

This invention relates to electron discharge devices having an electron emission system or like source or transmitter of energy controlled by the influence of a conductive region of variable characteristics created by a controlling electron discharge, and to electron discharge devices employing a plurality of emitters connected with sources of potential between them so that the electron emission from one will fall upon or approach or pass the other or others.

The invention has among its objects to provide for an exceptionally wide variation of energy in the controlled system in response to a small variation in the controlling energy, to provide a thermionic electron discharge device which is adaptable to a wide variety of applications, and to provide a thermionic valve which by virtue of the principle upon which it functions allows wide spacing of the electrodes and in which high sensitivity may be achieved by other means than by crowding the elements or electrodes together to a degree which increases manufacturing costs and jeopardizes the life and performance of the valve.

The invention consists in providing a thermionic electron discharge system having a thermionic cathode and a thermionic emitter which operates as an anode with respect to the cathode, the emission from which is controlled by the flow of a greater or smaller number of electrons from the cathode to the emissive anode or by a variation of the velocity with which the electrons from the cathode are projected towards this emissive anode, or by variations in both velocity and number of electrons simultaneously.

The invention further consists in providing an electron discharge system comprising three spaced electrodes of which the first acts as a thermionic emitter and the third as an anode respectively, the second serving as an anode with reference to the first electrode and as a thermionic emitter or cathode with reference to the third or anode, and in maintaining relative potentials upon the three electrodes such that the electron discharge from the first electrode controls the electron discharge from the second electrode to determine the current flow between the second and the third electrodes, whereby a variation or modification of the emission of the first electrode results in a variation or modification of the emission from the second electrode in a greatly magnified form.

The invention further consists in so spacing or disposing the said electrodes that the second electrode or emitter is interposed in fact or in effect between the first electrode or emitter and the third electrode or anode.

The invention further consists in the provision of means for controlling the influence of the emission of the first emitter upon the second emitter. Thus, provision may be made for the control of the function of the first emitter by the association therewith of a control element or elements which is or are preferably in the form of a grid.

It also comprises the provision of means for controlling the emission or influencing the current flow between the second emitter and the anode and for this purpose there may similarly be provided a control element or elements which may be in the form of a grid.

The system comprising two thermionic emitters, one of which is controlled by the other emitter and is placed with respect to the controlling emitter at a potential which may be uni-directional or oscillatory, to direct the emission from the first thermionic emitter towards the second emitter, and an anode may be assembled to form a hard or a gas-filled tube, in which the control element may be a normal grid structure and additional electrodes may be placed between the emitters to accelerate the stream of electrons passing between them. Similarly there may be provided control elements between the second emitter and the anode, which, for certain purposes, is preferably not in alignment with the two emitters and which, in conjunction with the second emitter, constitutes a simple diode structure.

The potential difference maintained between the thermionic emitters may be such that a current flows between them.

It is preferred to use thermionic emitters either of the filamentary type or of the indirectly heated equi-potential type, power being supplied from a suitable source, such as from batteries or transformers in the usual way.

A variety of useful effects have been observed in varying the values of the inter-emitter potentials and of the anode voltages and these may be chosen according to the effect desired. Thus, it has been observed that, in a highly evacuated tube, the effect of increasing the inter-emitter potential from a low value to a higher one is to reduce the current flowing between the anode emitter and its complementary anode, which is cold. This effect has been observed to occur even before a measurable current flows between the emitters. As the inter-emitter potential is increased a small current flows between the emitters which results in a large reduction in current in the controlled circuit, that is to say, between the anode emitter and its complementary anode.

A further increase in inter-emitter potential is accompanied by low anode current values. Following this there is a reversal or increase in anode current value as the potential reaches such a point that primary and secondary emission is obtained from the controlled emitter, to which is added such emission from the controlling emitter as may pass beyond the controlled emitter.

The curve of steepest slope is obtained when the anode current is reduced by the presence of inter-emitter current.

One of the advantages of the particular tubes according to the invention is that full grid control can be retained in the presence of gas, as ionization is confined to the anode and its associated emitter. The behaviour of the system is different when gas at low pressure is present, in that the steepest slope is obtained when the anode current is increasing with increased interfilament potential.

Gas filled tubes using filamentary cathodes can readily be constructed showing changes in anode current of from 50 to 100 milliamperes per volt on an associated control electrode.

The emission from the first emitter may be directed towards the second and focussed so as to direct the whole of the available energy towards the second emitter. The first emitter may conveniently comprise a heated cathode surrounded by an electrode which may take the form of a gun, this gun constituting a controlling electrode to vary the effective emission from the heated cathode.

Additional electrodes may also be provided in relation to the two emitters for directing or focussing the emission and may receive potentials of such an order and magnitude that the electrostatic lines of force extant between the electrodes controls the shape of the electron beam so that the whole of the energy falls on the second emitter. Alternatively magnetic focussing may be used to produce the same effect.

A suitable disposition of electrodes enables any desired law between input voltage and output current to be obtained. Thus, in the diode system formed by the second emitter and the anode, the emitter may be inclined so that the distance from the emitter to the anode is not uniform throughout its length and the emission from the first emitter may be directed so as to fall on part of or all of this second emitter, the position of the controlling beam being controlled by electrostatic or electro-magnetic means.

In certain forms of the electron discharge device, more particularly where the electrodes are contained within an evacuated envelope, the normal conditions of operation may be such that the emission from the first emitter does not extend to or reach the anode, the emission from the second emitter being determined by the number and velocity of the electrons from the first emitter which strike the second emitter. If the potential applied to the anode with respect to the second emitter be increased beyond a determined value for the particular electron discharge device, a field of influence is created which extends into the interelectrode gap between the two emitters. This may have the effect of causing electrons leaving the first emitter to pass to the anode. Again, if the potential between the two emitters be increased beyond a determined value for the particular electron discharge device the electrons from the first emitter acquire so high an acceleration that they are enabled to pass the second emitter and to proceed to the anode. The effect in each case is to reduce the efficiency of the electron discharge device by destroying in some degree the control exerted by the first emitter.

The invention thus consists also in providing screen elements disposed in relation to the first emitter of the electron discharge device such that the emission from the said emitter may be prevented from extending to the anode and so that the first emitter may be screened from the influence of a high potential applied to the anode.

The invention further consists in so disposing the electrodes of the electron discharge device that, in conjunction with a screening element or elements, the passage of the electrons from the first emitter to the anode may be prevented.

The invention also consists in the features of construction and arrangement of the elements of the device as hereinafter described.

The invention is illustrated, by way of example, in the accompanying drawings.

Figure 7 is a diagrammatic illustration of a form of the device in which the anode is disposed out of alignment with the emitters and a screen is provided to screen the control emitter from the influence of the anode.

Figure 8 represents diagrammatically a modified form of the device in which the control emitter is out of line with the controlled emitter and the associated anode, which is screened from the control emitter.

Figure 9 is a diagrammatic representation of a form of the device in which a plurality of screens is provided between the emitters for the purpose of focussing the discharge from the control emitter.

Figure 11 is a diagrammatic representation of a modified form of the device as illustrated in Figure 9 for use in a cathode ray tube intended for television purposes.

Figure 12 represents diagrammatically a further modification of the device in which a screened coiled control emitter is disposed between a sleeve type of controlled emitter and the associated anode.

Figure 13 is a perspective view of a modified device in which the second emitter is under the control of two controlling emitters which are screened in relation to the anode, which is out of alignment with the controlling emitter.

Figure 14 is an end elevation of the device shown in Figure 13.

Figures 15 to 18 illustrate circuit connections for various applications of the device.

Figure 1:
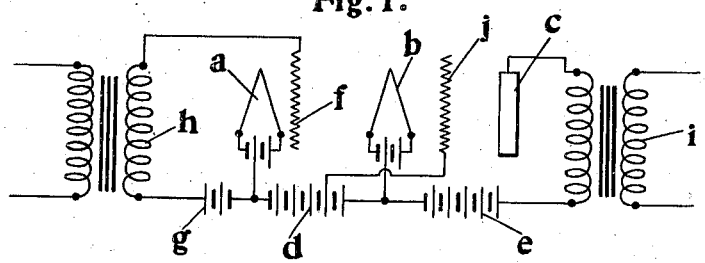
Figure 1 is a diagram of a simple form of the electron discharge device according to the invention.

Referring to Figure 1 of the accompanying drawings, the control emitter $a$ and the controlled emitter $b$, together with the anode $c$, are set in spaced relation and in alignment and the second emitter $b$ is maintained at a potential which is positive by reference to the first emitter $a$, the potential difference being provided by means of a battery $d$. Equivalent means of establishing a potential may, however, be used such as a transformer, the secondary of which is connected between the emitters, resistances, inductances and other reactive means of establishing a potential difference. A suitable potential is similarly applied to the anode $c$ by such means as a battery $e$. A controlling grid $f$ is interposed between the emitters $a$ and $b$ in a position to be effective with respect to the emission from the emitter $a$. Such grid receives the necessary bias potential from the battery $g$. As illustrated in the figure the input to the system may be effected through a transformer $h$, while similarly the output from the system may be effected by way of a transformer $i$.

With such an arrangement and connection of the emitters the electrons emitted by the emitter $a$ are projected to the emitter $b$ which they reach at a high acceleration dependent upon the voltage applied and by reason of the relatively low energy of the electrons emitted by the emitter $b$ the influence of the incoming electrons in view of their high velocity is such that an extremely small variation in the electrons discharged from the emitter $a$ results in a very large variation in the number of electrons emitted from the second emitter. If the voltage applied between the emitters $a$ and $b$ be increased, there results increased velocity of projection of the electrons from the emitter $a$ with a consequent effect upon the emission from the emitter $b$. Similarly, if the current applied to the emitter $a$ is increased the number of electrons projected in the direction of the emitter $b$ is also increased with consequent effects upon the emission of the emitter $b$. It is possible in consequence to effect a control of the current flowing between the emitter $b$ and the anode $c$ either by variation of the voltage or current between the two emitters or by variation of heating current or filament current applied to the emitter $a$ or by a combination of such controls.

Such a thermionic discharge system may be provided to operate in a vacuum or in the presence of a gas and the conditions as regards the potential difference between the emitters $a$, $b$ and the current supplied to the first emitter $a$ may be such that a current flows between the two emitters. The effect in the circuit of the anode $c$ of the influence of the emission of the emitter $a$ on the second emitter $b$ whether accompanied by a current flow or not, is, in the presence of a good vacuum, to produce a decrease in the current in the anode circuit by reason of the fact that the bombardment of the second emitter by the emission from the first results in the driving back of the electrons leaving the second emitter which are of low energy. Under certain conditions a further effect may be produced upon the emission from the emitter $b$ to the anode $c$ by reason of the fact that the emission of the emitter $a$ is also effective in the inter-electrode space between the emitter $b$ and the anode $c$ and in the inter-electrode space between the emitters $a$ and $b$ to produce a control of the current flow.

In the case where a poor vacuum or gas is present, the effect in the circuit of the anode $c$ of the influence of the emission of the emitter $a$ on the second emitter $b$ is to produce first the decrease of the anode current and then an increase of the anode current with the increase of the current between the emitters.

The emission from the emitter $a$ may further be controlled by means of the grid $f$ or a like controlling element interposed in the space between the emitters and serving where required as an input grid.

Control of the output characteristics may be provided by the interposition between the emitter $b$ and the anode $c$ of a grid $j$ or like control element having a fixed negative potential or a potential suitably related to the potentials of the emitter $b$ and of the anode $c$ and to the disposition of the grid or like control element in relation to the said electrons. The control grid $j$ is thus adapted to exert a predetermined effect upon the characteristics of the output system and to serve as an impedance control.

Other methods of varying the flow of electrons between the several electrodes may be adopted for the purpose of securing the required effects. Thus, control or blocking electrodes may be provided to screen the emitter $b$ to a greater or lesser degree from the emission from the first emitter $a$, such control operating to increase the current to the anode $c$ in the proportion to the extent to which the emission of the first emitter $a$ is screened. Similarly, when the charge applied to the control electrode is withdrawn there results a decrease in the anode current in consequence of the influence of the interelectrode flow of electrons from the emitter $a$ upon the emitter $b$.

A similar control may be secured by providing for the variation of the temperature of the emitter $a$ in such manner that by increase of the temperature the emission is increased and the current to the anode $c$ is reduced, whilst upon a decrease of the temperature of the emitter $a$ the electron discharge is reduced and the current to the anode $c$ is increased.

Other means of control of the emission from the emitter $a$ may be employed. Thus, electromagnetic or electrostatic means of deflecting or modifying the direction, distribution or form of the emission such as are hereinafter described may be provided so that the extent to which the said emission is active in its influence upon the emitter $b$ may be determined.

The electronic discharge system as illustrated in Figure 1 when also connected in the manner indicated to suitable input and output circuits, will serve as an amplifier, the electro-motive force to be amplified being applied to the grid $f$, while the anode circuit is coupled through the output $i$.

One and the same structure of electronic discharge device may, however, be adapted to serve different purposes according to the potential difference applied between the several electrodes or according to the current applied to or passing between the emitters and the degree of control exercised by way of the grid or grids or other control elements provided in the interelectrode spaces.

Figure 2:
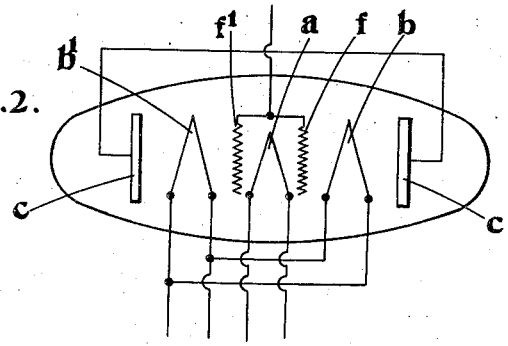
Figure 2 is a diagram illustrating a modified form of the device in which the controlling emitter is effective to control the function of two distinct emitters each co-operating with an anode.

The system as illustrated in Figure 1 represents a simple form which is adequate for many applications of the invention. The system may, however, be modified in form according to particular applications. Thus, as illustrated in Figure 2 a single emitter $a$ is provided to control two emitters $b$, $b^1$ disposed on opposite sides of the emitter $a$, and such emitters co-operate with anodes $c$, $c^1$. Controlling grids $f$, $f^1$ are provided in the interelectrode spaces between the emitter $a$ and the emitters $b$, $b^1$. In the formation of the circuits the emitters $b$, $b^1$ are connected in common as are also the anodes $c$, $c^1$ and the control grids $f$, $f^1$.

The form given to the several electrodes of which the system is constituted may also be varied according to requirements. Thus, in Figure 3, the control emitter $a$ and the controlled emitter $b$ are provided in the form of equi-potential sleeve electrodes indirectly heated as indicated by the heating wires $a^2$, $b^2$. The control grid $f$ is formed as a screen surrounding the emitter $a$, while the anode $c$ is provided as a plate which lies parallel to the length of the sleeve emitter $b$.

Figure 4:
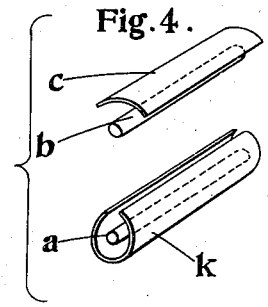
Figure 4 represents in perspective a form of the device in which sleeve emitters are disposed parallel and the controlling emitter is provided with a plate-like control element.

A widely differing construction of the electrode system embodying a directing element is illustrated in Figure 4. In this case the controlling emitter $a$ and the controlled emitter $b$ are provided as sleeve type equi-potential cathodes disposed in parallel relation, and the anode $c$ is provided as a plate having a transverse curvature disposed in the plane containing the two emitters. A grid $k$ in the form of an incomplete cylinder surrounds the emitter $a$ and is provided with the space between its adjacent edges in line with the path between the two emitters, so that there may be provided a small measure of focussing or directing of the beam emitted from the emitter $a$ in the direction of the emitter $b$.

Figure 3:
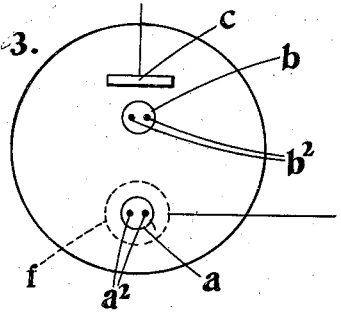
Figure 3 illustrates diagrammatically a simple form of the device provided with sleeve type emitters and a control grid.
Figure 5:
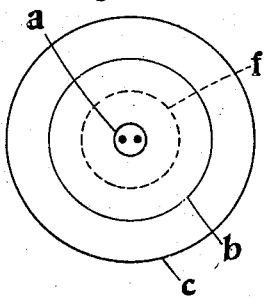
Figure 5 represents in end elevation a form of the device in which the electrodes are concentrically arranged.
Figure 6:
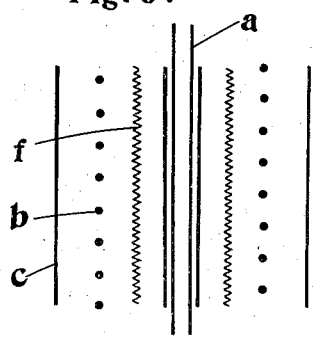
Figure 6 is an axial section of the device shown in Figure 5.

In the construction represented in Figures 5 and 6 a concentric arrangement of the electrodes is provided. Thus the emitter $a$ in the form of an indirectly heated equi-potential cathode, such as is illustrated in Figure 3, is surrounded by a grid $f$ in the form of a sleeve. The emitter $b$ is provided as a helix coated with emissive material and surrounding the grid $f$ and is heated so as to form a thermionic emitter. The anode is formed as a cylinder enclosing the emitter $b$.

It may be emphasized that the output system may comprise a simple diode structure as previously mentioned or alternatively additional electrodes may be introduced between the emitter and the anode so as to procure triode or pentode characteristics, or alternatively to control the impedance of the output system.

It is found in operation that the best results are obtained when the load in the external circuit between the two emitters is approximately equal to the internal resistance of the emitters. This load may take the form of a resistance, inductance or reactive circuit or a tuned impedance, or combinations of such loads.

Where screening is employed, a screen may be provided in a position disposed between the controlling emitter $a$ of the electron discharge device and the anode $c$, and where the emitters are provided, for example, in the form of cylindrical coils arranged longitudinally upon a common axis, as represented in Figure 7, the screen $p$ may be of a truncated conical form, the apex of the cone being disposed upon the common axis of the emitters $a$, $b$.

The screening element or each screening element may be provided to operate entirely as a mechanical screen or may have applied to it a potential for the purpose of assisting the screening effect.

Where the screening element is provided either as a mechanical or an electrical screen the effect of confining the emission from the first emitter to the second emitter may be assisted, as indicated in Figure 7, by the disposition of the anode $c$ in a plane normal to the common axis of the emitters $a$, $b$ and containing the second emitter $b$. The disposition of the anode $c$ by reference to the emitter $a$ and the presence of the screen also ensures that $c$ cannot act as an accelerating electrode in respect of the emitter $a$.

It will be understood that the screen or screens employed require to be constructed and disposed with regard to the form and disposition of the electrodes of the device. Thus, as illustrated in Figure 8, the emitters $a$, $b$ may be arranged so that they lie parallel one to the other and the grid $f$ may be provided as a coil or open cylinder concentric with the emitter $a$ while the plate anode $c$ is disposed out of the plane of the emitters $a$, $b$. In such a system the screen $p$ may be provided as an angular member suitably disposed parallel with the electrodes of the system.

Again, the screening of the first emitter $a$ against the effect of an extended influence of the anode $c$ due to a relatively high potential applied to the anode may be effected, as represented in Figure 9, in the case of emitters in the form of cylindrical coils disposed about a common axis by the provision of cylindrical screens $q$, $q^1$, one of which $q$, disposed adjacent the first emitter $a$, is provided at a positive potential, and the second $q^1$ of which, of smaller diameter and disposed further from the first emitter, is provided at a negative potential. Such screens fill, in relation to the emission from the first emitter, the function of a compound lens and focus the beam of electrons on the second emitter, while at the same time an electrostatic field is provided by the screens which prevents the field of influence of the anode from extending to the first emitter. Such an arrangement of screens is especially suitable in the case of an electron discharge device the electrodes of which are disposed in alignment.

It will thus be understood that the screens may comprise a plurality or series of screens to each of which or to certain of which a difference of potential is applied.

It is to be observed, with regard to the effect of positive potentials on the electron beam, that if, for example, two co-axial sheaths with a potential difference between them are used to control the focus of an electron beam, the lines of force run in the same plane as the electron beam and reduce the effective diameter thereof. In the electron discharge systems according to the invention the beam receives in part a measure of control or focus from the action of the first emitter and additional control from the anode.

Figure 10:
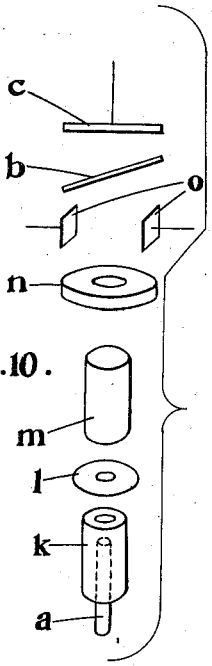
Figure 10 illustrates a form of the device provided with an electron beam focussing element and with an inclined cathode.

In Figure 10 the control emitter $a$ is enveloped by a gun $k$ facing an accelerating anode $l$ so that the emission from $a$ is controlled in intensity by the gun $k$ and accelerated by the anode $l$. The electrons projected through the accelerating anode are focussed as by a lens system to the form of a fine pencil or beam by means of two focussing electrodes $m$, $n$ in the form of cylindrical or annular electrodes, and the focussed beam is controlled in position or subjected to deflection by means of deflecting plates $o$ so as to fall upon the controlled emitter $b$ in the manner desired and to effect the influencing of the emission from the emitter $b$ to the anode $c$. Figure 10 further illustrates the inclination of the emitter $b$ with reference to the anode $c$ so that the path between the said electrodes is of varying length. The emission from the emitter $b$ to the anode $c$ is controlled by the position and intensity of the pencil of rays from the emitter $a$ and since it varies along the length of the emitter $b$ it follows that a varying emission can be obtained according to the position of the pencil of rays from the emitter $a$ with respect to the emitter $b$. While Figure 7 shows the emitter $b$ as a plane surface set at an angle to the anode $c$, it will be understood that it may be deformed to provide any desired width of path at any point between the two electrodes. It will also be understood that the width of the emitter $b$ in the direction transverse to that of the beam and to the plane in which the inclination of the emitter $b$ is effected may also be varied so that in the deflection of the beam of electrons it may fall upon a varying width of area of the emitter $b$.

The invention may be applied with advantage to the construction of cathode ray tubes for use in television and for general purposes.

With ordinary cathode ray tubes, as used for television, the intensity of the beam is varied by means of control elements. These elements not only control the number of electrons reaching the fluorescent screen, but also vary the velocity of the electrons, thereby spoiling the focus of the beam.

With high definition television, focus is of great importance, so that any system which will enable constant focus to be maintained is of value. This applies to gas-filled and vacuum tubes, but where gas is used as a means of focussing, the question of focus becomes even more difficult, since the inertia of the gas molecules spoils the true deflection, definition and focus of the beam at high scanning speeds.

It is possible by the application of the invention to overcome or minimize largely the disadvantages before referred to since the velocity of the electrons reaching the fluorescent screens can be maintained constant, their number only being varied. There is thus provided means for maintaining a constant focus, such means being specially suitable and effective in vacuum tubes. Having regard, however, to the relatively high potential difference that requires to be maintained between the anode and the second emitter, and the relatively small potential difference that is required between the emitters, it is desirable to adopt such constructions as ensure against the influence of the anode potential upon the first emitter or the inter-electrode gap between the emitters. Thus a construction such as those hereinbefore described in which the anode is disposed at right angles to the plane of the emitters is advantageous. A further and effective construction for the purpose is illustrated in Figure 11 and comprises an arrangement in which the first emitter $a$ is provided in the form of a cylindrical coil and the first emitter is spaced coaxially with the second emitter $b$, which also is a cylindrical coil, and the anode $c$ and disposed between the said electrodes. The emission from the emitter $a$ is directed towards the emitter $b$ by applying a suitable potential between them. In order to prevent the emission from the emitter $a$ reaching the anode $c$ and to avoid the influence of the anode potential upon the first emitter the latter is screened by a tubular screen $s$ disposed at the interior of the coil and provided at the end which lies adjacent the anode $c$ with an annular flange $s^1$ extending radially outwards. The screen is subjected to a suitable negative potential with respect to the emitter $a$. By such means the discharge of the first emitter $a$ is effected in a direction away from the anode $c$ and the discharge from the second emitter $b$ to the anode is effected through the cylindrical screen $s$. The screen being given a suitable potential in relation to the potentials of the emitters and the anode serves to assist in restricting the path of the electrons from the emitter $b$ and to maintain the constant focus. The anode $c$ is advantageously formed as a disc perforated at the centre for the passage of the beam to the fluorescent screen $t$ and provided with a cylindrical screen $c^1$ extending from the periphery in the direction of the fluorescent screen, and is maintained at a positive potential with respect to the emitter $b$. Such anode screen serves also by reason of the potential at which it is maintained to assist in restricting the path of the electrons and electron beam to a fine pencil of rays. In order that there may be no possibility of the influence of the anode becoming effective upon the first emitter by passage around the periphery of the flange $s^1$ of the emitter screen $s$, the said flange $s^1$ may be extended radially outward as may be found desirable. Where it is required, for example, to restrict the overall width of the electron discharge system a cylindrical or slightly conical screen $c^2$ may be provided to surround the first emitter $a$ and the anode $c$, such screen being given a potential such as to confine the field resulting from the potentials applied to the anode and to the emitter screen to a central or axial position such that the first emitter is not prejudicially affected and further to assist in restricting the beam reaching the screen $t$ to a fine pencil. The position of the beam may be controlled by electrostatic or electro-magnetic means, as hereinbefore described. A control grid may be provided in the form of a cylindrical element to surround or enclose the first emitter. A simple form of such a device is also illustrated in Figure 12, in which the screen $s$ is flared for the purpose of protecting the emitter $a$ from the tubular anode $c$.

The same considerations apply in the case of electron discharge systems provided with other forms of electrodes than those hereinbefore described. Thus, instead of cylindrical coils ribbon forms of the emitters may be employed. A suitable construction of cathode ray system involves a second emitter in the form of a tube with a small quantity of emissive substance in the centre, facing the anode and the screen, and a first emitter formed by two strips of filament facing the second emitter and in line with it and spaced on the anode side thereof, each filament having a control grid around it. In Figures 13 and 14 there is illustrated such a device, in which, as in Figure 9, the electrodes are disposed parallel one with the other and angular screens $s^2$ are provided to screen the emitters $a$ from the anode $c$.

In the application of the electron discharge devices such as are hereinbefore described it is necessary to provide for suitable potentials between the anode and the second emitter, between the two emitters and between the first emitter and the control grid relating thereto where such is provided. Local potentials are also required in respect of the emitters. The manner in which these potentials are secured may be varied according to the particular application of the electron discharge device. Thus, in order that the potentials may be obtained from a common source and that the device may be used as an oscillator there may be provided, as shown in Figure 15, a resistance 1 between the emitters $a$ and $b$ and a second resistance 2 between the emitter $a$ and the controlling grid $f$. The resistance 2 in conjunction with a capacity 3 may form an oscillatory circuit and the output may be taken from the anode lead by a transformer 4, the lead being connected to the source of current 5 which extends to the negative side of the coil 2. The current between the anode $c$ and the emitter $b$ is invariably larger than the current between the emitters $b$ and $a$, so that the resistance 1 when traversed by the latter current produces a potential drop between $a$ and $b$. The resistance 2 is traversed both by the interemitter current and the current from the emitter $b$ to the anode $c$, and the resulting potential can be utilized to provide the necessary potential for the grid $f$.

In the oscillator circuit illustrated in Figure 16, the emitter $b$ is connected through an inductive coil 6 to the source of current 5 which is connected in turn to the emitter $a$. The anode $c$ is provided with a coil 7 shunted by a condenser 8 and in loose coupling with the coil 6. It has before been indicated how control may be effected by varying the potential between the emitters $a$ and $b$. A steady potential is applied from the current source 5 through the coil 6 which is coupled to the coil 7 in the circuit of the anode $c$, which coil is resonated by the condenser 8. The emission from the emitter $b$ varies with the potential between the emitters $a$ and $b$, which is varied by the coil 6. By reason of the phase difference in the two circuits an oscillatory impulse is generated and maintained in the circuit 7 to 8. The oscillatory energy available appears across the coil 7 and may be collected inductively or capacitively.

A circuit for the connection of the electron discharge device to permit its use as an oscillator-amplifier is illustrated in Figure 17. In this case the emitter $a$ is connected with the grid $f$ by a coil 9 which is variably coupled with an oscillatory circuit 10, connected directly to the emitter $a$ and with the emitter $b$ by way of a resistance 11 with a condenser 12 in shunt. The anode is connected to an output coil 13 shunted by a condenser 14. The emitter $b$ forms with the grid $f$ and the emitter $a$ a triode which serves with the oscillatory circuit to form a normal triode oscillator. The emission from the emitter $a$ is controlled and varied by the grid $f$ so that the effective emission from the emitter $b$ is also varied. The oscillatory current which is generated in the output at 13 and 14 is an amplification of that produced in the circuit 10.

In the provision of a circuit connection for the use of the device as an amplifier with cathode coupling, as illustrated in Figure 18, the energy in the controlled circuit, that is to say, the circuit including the emitter $b$ and the anode $c$, is always greater than that between the emitters $a$ and $b$. Resistances 15, 16 and 17 are connected in series between the high tension negative lead and the emitter $b$, and the emitter $a$ is connected to the intermediate point between the resistances 15 and 16, while a lead for connection to the input circuit is in turn connected to the control grid $f$ between the resistances 17 and 16. The output is taken across the resistance 17 which may be inductive, resonant or resistive, according to the characteristics required. Where an inductance is provided as the component 17 this may serve as the primary of a transformer adapted to supply the succeeding valve or electron discharge device. Alternatively, with similar connections for the electron discharge device a resistance capacity coupling may be employed between the said electron discharge device and the succeeding valve or discharge device. Where an impedance is provided in the negative lead a direct coupling may be effected to the grid of the succeeding electron discharge device or valve. Where a resistance is used as the impedance the grid of the succeeding valve will receive a positive potential if coupled directly to the said resistance. It is thus necessary to connect in the negative lead of the succeeding valve or electron discharge device a resistance of such a value as to produce an equal positive potential, adding the neecssary voltage to provide the grid bias. A direct coupling such as described has the advantage that the coupling functions solely from the point of view of resistance and is not discriminative of frequency. A uniform response with constant phase relation may thus be obtained over a wide range of frequencies, that is to say, the absence of a coupling condenser or transformer ensures the complete elimination of time constant, so that uniform frequency response is obtained with constant phase shift. This fact is advantageous in a number of applications, particularly television.

When this form of coupling is used with normal output valves, the drop resistanc becomes excessive, so that a large wattage is used. The valve as hereinbefore described may be constructed with extremely low anode impedance, so that the value of the resistance 17 is low, and the voltage drop is low. The system has therefore a much wider application.

Where desired, tuned circuits may be provided respectively to form the connection of the input grid and of the electron discharge device with the negative lead. Alternatively, such tuned circuits may be connected into the anode circuit of the electron discharge device, but in this event the tuning condenser has a potential above earth potential which is often inconvenient in the use of a multi-ganged assembly. In the use of tuned circuits as described a grid may be provided in the output circuit for the purpose of screening the anode from the influence of the input system through the inter-electrode capacity of the electron discharge device. This capacity is inherently low, but where difficulty is occasioned by reason of the capacity as in the case when the device is functioning on short wave lengths, the effect of the capacity may be neutralized by means of a suitable bridge circuit.

It will be understood that the screens that are employed for the shielding of the first emitter or for the focussing of the electron discharge therefrom may be of a shape determined by the shape or form of the emitters. Thus, where the second emitter is of cylindrical form, the focussing screens may also be provided of cylindrical form, but if the second emitter is of an elongated cross-section the focussing electrodes are advantageously provided of a similar cross-sectional shape.

In the claims, the emitters $a$ and $b$ are referred to as being filamentary, but it is to be understood that this terminology is used to designate both a uni-potential cathode provided with a heating element and also a cathode consisting merely of a metal filament.

We claim:

1. In combination, an electron discharge system comprising a collector and a filamentary source of thermionic emission associated therewith, and a second filamentary source of thermionic emission exterior to the system, said second source being arranged to project electrons to said first source for controlling the emission in said system by the action of the electrons projected from said second source and impinging upon the source of thermionic emission of the system.

2. An electron discharge device comprising an anode and an associated filamentary thermionic emitter forming an electron discharge system and exterior to the said system a second or controlling filamentary thermionic emitter arranged to project electrons to said first emitter, the number and velocity of the electrons from which in impinging upon the first emitter determine the emission therefrom to the anode, means for supplying heating current to said emitters, and circuit connections between said emitters including a potential source and a load independent of the output of said electron discharge system.

3. An electron discharge device comprising an anode and an associated filamentary thermionic emitter from an electron discharge system and exterior to the said system a plurality of controlling filamentary thermionic emitters arranged to project electrons to said first emitter, the number and velocity of the electrons from which determine the emission from the first emitter to the anode, means for supplying heating current to said emitters, and circuit connections between said emitters including a potential source and a load independent of the output of said electron discharge system.

4. An electron discharge device comprising a plurality of electron discharge systems each consisting of an anode and an associated filamentary thermionic emitter, and exterior to the said systems a controlling filamentary thermionic emitter arranged to project electrons to said first emitter, the number and velocity of the electrons from which determine the emission from the emitter of each system towards the associated anode, means for supplying heating current to said emitters, and circuit connections between said emitters including a potential source and a load independent of the output of said electron discharge system.

5. An electron discharge device comprising a collector and a filamentary source of thermionic emission associated therewith to form an electron discharge system, a second filamentary source of thermionic emission exterior to the said system for controlling the emission in the said system, said second source being arranged to project electrons to said first source, a source of potential connected between the sources of thermionic emission to direct the emission from the second source of thermionic emission to the first, means for supplying heating current to said sources, and a load in series with said potential source, said load being independent of the output of said electron discharge system.

6. An electron discharge device comprising a collector and a filamentary source of thermionic emission associated therewith to form an electron discharge system, a second filamentary source of thermionic emission exterior to the said system for controlling the emission in the said system, means for supplying heating current to said sources, a source of potential connected between the sources of thermionic emission to direct the emission from the second source of thermionic emission to the first, means for focussing the emission from the second source of emission upon the first and a load in series with said potential source, said load being independent of the output of said electron discharge system.

7. An electron discharge device comprising a collector and a filamentary source of thermionic emission associated therewith to form an electron discharge system, a second filamentary source of thermionic emission exterior to the said system, said second source being arranged to project electrons to said first source for controlling the emission in the said system, means for supplying heating current to said sources, a source of potential connected between the sources of thermionic emission to direct the emission from the second source of thermionic emission to the first, a control electrode for controlling the energy emitted by the controlling or second source of thermionic emission for the purpose of controlling the emission from the first and a load in circuit with said potential source, said load being independent of the output of said electron discharge system.

8. An electron discharge device comprising a collector and a filamentary source of thermionic emission associated therewith to form an electron discharge system, a second filamentary source of thermionic emission exterior to the said system for controlling the emission in the said system, means for supplying heating current to said sources, a source of potential connected between the sources of thermionic emission to direct the emission from the second source of thermionic emission to the first, means for focussing the emission from the second source of emission upon the first, a control electrode for controlling the energy emitted by the controlling or second source of thermionic emission for the purpose of controlling the emission from the first and a load in circuit with said potential source, said load being independent of the output of said electron discharge system.

9. An electron discharge device comprising a collector and a filamentary source of thermionic emission associated therewith to form an electron discharge system, a second filamentary source of thermionic emission exterior to the said system for controlling the emission in the said system, means for supplying heating current to said sources, a source of potential connected between the sources of thermionic emission to direct the emission from the second source of thermionic emission to the first, means for varying the direction of the path of emission from the second or controlling source of emission to the first source of emission and a load in circuit with said potential source, said load being independent of the output of said electron discharge system.

10. An electron discharge device comprising a collector and a filamentary source of thermionic emission associated therewith to form an electron discharge system, a second filamentary source of thermionic emission exterior to the said system for controlling the emission in the said system, means for supplying heating current to said sources, a source of potential connected between the sources of thermionic emission to direct the emission from the second source of thermionic emission to the first, electro-static means for varying the direction of the path of emission from the second or controlling source of emission to the first source of emission and a load in circuit with said potential source, said load being independent of the output of said electron discharge system.

11. An electron discharge device comprising a collector and a filamentary source of thermionic emission associated therewith to form an electron discharge system, a second filamentary source of thermionic emission exterior to the said system for controlling the emission in the said system, means for supplying heating current to said sources, a source of potential connected between the sources of thermionic emission to direct the emission from the second source of thermionic emission to the first, electro-magnetic means for varying the direction of the path of emission from the second or controlling source of emission to the first source of emission and a load in circuit with said potential source, said load being independent of the output of said electron discharge system.

12. An electron discharge device comprising a collector, and a filamentary source of thermionic emission associated therewith to form an electron discharge system, a control element for varying the impedance of the system, a second filamentary source of thermionic emission exterior to the said system, said second source being arranged to project electrons to said first source for controlling the emission in the said system by projecting the electrons therefrom upon the source of emission of the said system, a source of potential connected between the sources of thermionic emission to direct the emission from the second source of thermionic emission to the first, means for supplying heating current to said sources and a load in circuit with said potential source, said load being independent of the output of said electron discharge system.

13. An electron discharge devise comprising an anode and an associated filamentary thermionic emitter forming together an electron discharge system and exterior to the said system a second or controlling filamentary thermionic emitter arranged to project electrons to said first emitter, the number and velocity of the electrons from which determine the emission from the first emitter to the anode, the anode, associated thermionic emitter and the controlling thermionic emitter being disposed in line, means for supplying heating current to said emitters and circuit connections between said emitters including a potential source and a load independent of the output of said electron discharge system.

14. An electron discharge device comprising an anode and an associated filamentary thermionic emitter forming together an electron discharge system and exterior to the said system a second or controlling filamentary thermionic emitter, the number and velocity of the electrons from which determine the emission from the first emitter to the anode, associated thermionic emitter and the controlling thermionic emitter being concentrically disposed, means for supplying heating current to said emitters and circuit connections between said emitters including a potential source and a load independent of the output of said electron discharge system.

15. An electron discharge device comprising an anode and an associated filamentary thermionic emitter forming together an electron discharge system and exterior to the said system a second or controlling filamentary thermionic emitter, the number and velocity of the electrons from which determine the emission from the first emitter to the anode, the anode being disposed at an angle out of the path of emission between the two emitters, means for supplying heating current to said emitters and circuit connections between said emitters including a potential source and a load independent of the output of said electron discharge system.

16. An electron discharge device comprising an anode and an associated thermionic emitter forming together an electron discharge system, and exterior to the said system a second or controlling thermionic emitter, the number and velocity of the electrons from which determine the emission from the first emitter to the anode, and a screening element for screening the electrostatic field of the anode from the controlling thermionic emitter, the anode being disposed out of the line of the two emitters.

17. An electron discharge device comprising a collector and a source of thermionic emission associated therewith to form an electron discharge system, a second source of thermionic emission disposed exterior to the said system, said second source being arranged to project electrons to said first source for controlling the emission in the said system by projecting thet electrons therefrom upon the source of emission of the said system, an evacuated envelope for containing the said system and the second source of thermionic emission, means for supplying heating current to said sources, and circuit connections between said source including a potential source and a load independent of the output of said electron discharge system.

18. An electron discharge device comprising a collector and a source of thermionic emission associated therewith to form an electron discharge system, a second source of thermionic emission disposed exterior to the said system, said second source being arranged to project electrons to said first source for controlling the emission on the said system, an envelope for containing the said system and the second source of thermionic emission, the said envelope containing an inert gas, means for supplying heating current to said sources, and circuit connections between said source including a potential source and a load independent of the output of said electron discharge system.

19. An electron discharge device comprising a collector, and a filamentary source of thermionic emission associated therewith to form an electron discharge system, and a control element for varying the impedance of the system, a second filamentary source of thermionic emission exterior to the said system, said second source being arranged to project electrons to said first source for controlling the emission in the said system, a source of potential connected between the sources of thermionic emission to direct the emission from the second source of thermionic emission to the first, a control electrode for controlling the energy emitted by the controlling or second source of thermionic emission for the purpose of controlling the emission from the first, means for supplying heating current to said sources and a load in series with said potential source, said load being independent of the output of said electron discharge system.

20. An electron discharge device comprising an anode and an associated thermionic emitter forming therewith an electron discharge system and so disposed in relation to the anode that the intervening distance and therefore the impedance characteristics of the intervening path may vary from point to point throughout the length of the emitter, a second or controlling thermionic emitter disposed exterior to the said system and the number and velocity of the electrons from which determine the emission from the first emitter to the anode, a source of potential connected between the thermionic emitters to direct the emission from the second thermionic emitter to the first, means for focussing the said emission and means for varying the direction of the path of the second emission so that any or all of the said emission falls upon the controlled emitter, means for supplying heating current to said emitters, and a load in series with said potential source, said load being independent of the output of said system.

21. An electron discharge device comprising an anode and a filamentary thermionic cathode, an output circuit connected between said anode and said cathode only, an electron emitter exterior of the electron path between said cathode and anode, said electron emitter being arranged to project electrons to said cathode, means for supplying heating current to said cathode and emitter, and circuit connections including a potential source and a load independent of the output circuit of said electron-discharge device for applying a potential difference between said emitter and cathode to direct electrons from said emitter to said cathode to control the emission of electrons from said cathode.

22. An electron discharge device according to claim 21 characterized by two sets of cathodes and anodes connected by an output circuit and a single electron emitter for supplying electrons to both said cathodes to control the electron emission therefrom.

23. An electron discharge device according to claim 21 characterized by means for focusing the emission from said emitter on said cathode.

24. An electron discharge device according to claim 21 characterized by a control electrode interposed between said emitter and cathode for controlling the electron emission from said emitter.

25. An electron discharge device according to claim 21 characterized by means for varying the direction of the electron path between said emitter and cathode.

26. An electron discharge device according to claim 21 characterized by a control element in the output circuit for varying the impedance thereof.

27. An electron discharge device according to claim 21 characterized by the anode being disposed out of the line of the cathode and emitter.

28. An electron discharge device according to claim 21 characterized by a screen element for shielding the electrostatic field of the anode from the emitter, the anode being disposed out of the line of the emitter and cathode.

29. An electron discharge device comprising an anode and a filamentary thermionic cathode, an output circuit connected between said anode and said cathode only, an electron emitter exterior of the electron path between said cathode and anode, said emitter being arranged to project electrons to said cathode, means for supplying heating current to said emitter and cathode and a circuit between said emitter and cathode including a source of potential and a resistor, said source of potential being effective to apply a potential difference between said emitter and cathode to direct electrons from said emitter to said cathode to control the emission of electrons from said cathode.

30. An electron discharge device according to claim 29 characterized by means for focusing electron emission from said emitter on said cathode.

31. An electron discharge device according to claim 29 characterized by a control electrode interposed between said emitter and cathode for controlling electron emission from said emitter.

32. An electron discharge device according to claim 29 characterized by a control electrode interposed between said emitter and cathode for controlling electronic emission from said emitter, and means for focusing electron emission from said emitter and said cathode.

PAUL SCHWERIN.
HUBERT CYRIL ATKINS.

CERTIFICATE OF CORRECTION.

Patent No. 2,150,346.    March 14, 1939.

PAUL SCHWERIN, ET AL.

It is hereby certified that error appears in the printed specification of the above numbered patent requiring correction as follows: Page 6, second column, line 19, for "neecssary" read necessary; line 34, for "resistanc" read resistance; page 8, first column, lines 56 and 70, claims 14 and 15 respectively, after "emitter" and before the comma insert arranged to project electrons to said first emitter; line 59, claim 14, before "associated" insert the words and comma the anode,; and that the said Letters Patent should be read with this correction therein that the same may conform to the record of the case in the Patent Office.

Signed and sealed this 16th day of May, A. D. 1939.

Henry Van Arsdale (Seal)    Acting Commissioner of Patents.